United States Patent [19]
Kraft

[11] Patent Number: 5,873,174
[45] Date of Patent: Feb. 23, 1999

[54] MEASURING TAPE HOLDING SYSTEM

[76] Inventor: Wendell P. Kraft, 3157 Patton Dr., Des Plaines, Ill. 60018

[21] Appl. No.: 759,194

[22] Filed: Dec. 5, 1996

[51] Int. Cl.⁶ .................................................... G01B 3/10
[52] U.S. Cl. ................................................ 33/758; 33/770
[58] Field of Search ............................. 33/758, 759, 760, 33/770, 755, 756

[56] References Cited

U.S. PATENT DOCUMENTS

| | | | |
|---|---|---|---|
| 370,636 | 9/1887 | Martin | 33/770 |
| 1,102,436 | 7/1914 | Richardson | 33/770 |
| 1,542,990 | 6/1925 | Di Tomasso | 33/770 |
| 2,770,883 | 11/1956 | Hackney | 33/770 |
| 3,662,471 | 5/1972 | Lynde | 33/770 |
| 4,353,167 | 10/1982 | Martin | 33/770 |
| 5,172,486 | 12/1992 | Waldherr | 33/770 |

FOREIGN PATENT DOCUMENTS 449979  4/1968  Switzerland ............................. 33/758

*Primary Examiner*—Christopher W. Fulton
*Assistant Examiner*—Andrew Hirshfeld
*Attorney, Agent, or Firm*—Dillis V. Allen, Esq.

[57] ABSTRACT

A system for holding fast the zero end of a measuring tape to permit measurements to be read from the tape without compensation, including a generally triangular weighted body with three downwardly projecting pointed end legs, one of which holds the zero end loop or hook of a measuring tape, the legs being pointed to engage and hold on certain surfaces, and also being retractable to permit elastometric pads on the body to hold the body fast on damageable surfaces.

11 Claims, 4 Drawing Sheets

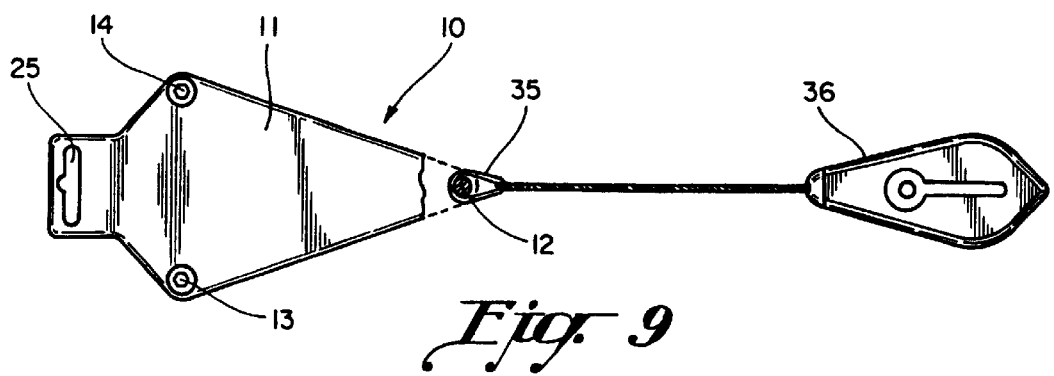

5,873,174

MEASURING TAPE HOLDING SYSTEM

BACKGROUND OF THE INVENTION

There have in the past been provided many devices to hold the zero end of a measuring tape in a fixed position so that one person can make various measurements without the need for a helper to hold the tape in position. Such devices are particularly useful for contractors, surveyors, and other types of professional and trade people but can also be used by the homeowner for various projects around the home.

One such device is disclosed in the Lynde, U.S. Pat. No. 3,662,471, issued May 16, 1972, which shows a cast iron block 10 with a hook-eye 14 at one end and a hook 13 at the other end. The block hook is designed, as seen in FIG. 7, to hold a loop-type tape and the hook-eye 14 as shown in FIG. 5, is adapted to hold a hook-type tape end. The bottom of the block 12 is bonded to a piece of foam material 15 for the purpose of frictionally engaging the ground or floor to hold the device from sliding. The foam 15 is a problem because it permits the block to shift slightly while the tape is pulled even without the lower surface of the foam 15 sliding simply by the lateral deformation of the foam. Another problem with this design is that the block 12 is usually positioned between the mark, such as the vertical wall, at the beginning of the tape so that compensation is required to make measurements. Lynde attempts to solve this problem in FIGS. 8 and 9 with a slotted bottom in the foam, but this embodiment is suggested only for use with a chalk line and not with a tape. Furthermore, it is difficult to determine how the tape can be bent around in the fashion shown with the chalk line 27 in FIGS. 8 and 9 without causing either damage to the tape or again requiring some measurement compensation.

The tape line shown in the Rand, U.S. Pat. No. 1,290,350, issued Jan. 17, 1919, discloses using a pointed member, but it is in fact a screw assembly that is pivotal directly to the tape so that it is not an after-market item. The screw also must be threaded into the floor or ground, and in some applications this could be unsuitable.

The same deficiency is found in the Di Tomasso, U.S. Pat. No. 1,542,990, issued Nov. 22, 1923, because the tooth or spur 12 must be driven into the work to hold the tape end in position.

The Morrison, U.S. Pat. No. 3,145,477, issued Aug. 25, 1964, and the Martin, U.S. Pat. No. 4,353,167, issued Oct. 12, 1982, show magnet-type end holders that require measurement compensation.

The Drew, et al., U.S. Pat. No. 2,711,030, issued Apr. 19, 1955, shows a suction cup tape end holder, and the Berkovic, U.S. Pat. No. 2,686,366, issued Aug. 17, 1954, shows a tape end holder that is designed specifically for clothing.

The Shields, U.S. Pat. No. 4,999,924, issued Mar. 19, 1991, shows a tape device that is not in fact a tape holder at all. In Shields, the tape is held in position against the work by tape hook 5 when the two part block member that receives the tape is not for the purpose of holding the tape in position at all, but for the purpose of making repeated measurement marks a fixed distance from the tape hook 5. That is, the two part block 3 and 4 is clamped around the tape in a position so the surface 6A is the distance desired to be marked from the tape end 5. The worker then positions the tape hook 5 over the starting position and then whacks surface 11 with a hammer causing blade 6 to mark and groove the workpiece at the desired marking location. Thus, this is not a tape end holder at all and is, therefore, not relevant.

Other patents that show tape end holders include the Buhler, U.S. Pat. No. 5,214,859, issued Jun. 1, 1993; the Knapp, U.S. Pat. No. 5,010,657, issued Apr. 30, 1991; and the Hanson, U.S. Pat. No. 3,834,030, issued Sep. 10, 1974.

It is a primary object of the present invention to ameliorate the problems noted above in measuring tape holders.

SUMMARY OF THE PRESENT INVENTION

In accordance with the present invention, a system is provided for holding fast the zero end of a measuring tape to eliminate the need for a helper and permit a wide variety of measurements to be made by a single person. Towards these ends, the present measuring tape holding system includes a generally triangular weighted body with three downwardly projecting legs that take the form of threaded screws with hardened cone points, one of which holds the tape end by engaging a notch in a tape eye or ring. The tape holding thumb screw is located at a narrow pointed end of the body and its conical end holds the measuring tape loop either directly against a vertical wall or at the juncture of two vertical walls that enable measurements to be taken directly from the wall or corner without adding the length of the holding device as required in many of the holding devices described above in the Background of the Invention. The pointed ends of the screws can also hold a tape in position and permit the user to rotate the tape to swing arcs and find diagonals.

This system can also be utilized to hold a snap line or dry line at a pre-determined location and eliminate the need for a helper in this situation. Furthermore, by utilizing two of these devices at each end of a snap line or dry line, a single person can accomplish line snapping without any helpers whatsoever.

Other objects and advantages of the present invention will become more clear from the following detailed description.

BRIEF DESCRIPTION OF THE DRAWINGS

FIG. 9 is a top view of the present measuring system holding a loop end of a snap line fast.

DETAILED DESCRIPTION OF THE PREFERRED EMBODIMENT

Figure 1:
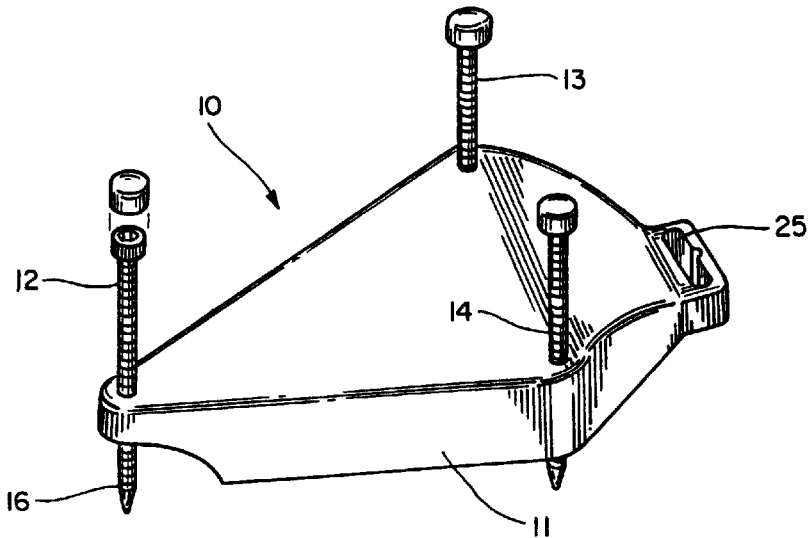
FIG. 1 is a perspective view of the present invention.

Referring to the drawings and particularly FIGS. 1 to 4, a measuring system according to the present invention is generally designated by the reference numeral 10 and is seen to include a generally triangular weighted body member 11 having three thumb screws 12, 13 and 14 threaded therethrough, each spaced parallel having hardened conically pointed ends 16.

The body member 11 can be a sandcast one-piece iron casting or can be a hollow plastic molding filled with a weighting material such as sand or lead with a removable cover not shown in the drawings.

Figure 2:
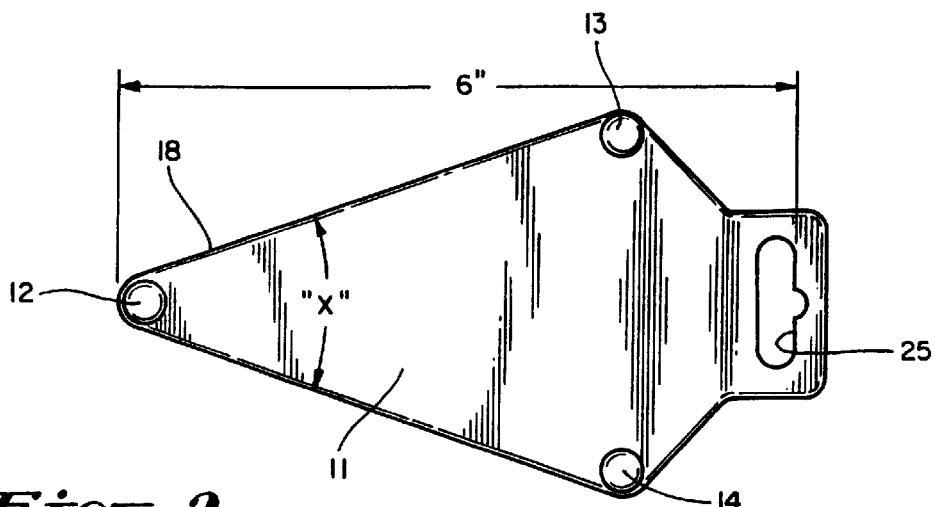
FIG. 2 is a top view of the measuring system illustrated in FIG. 1.
Figure 3:
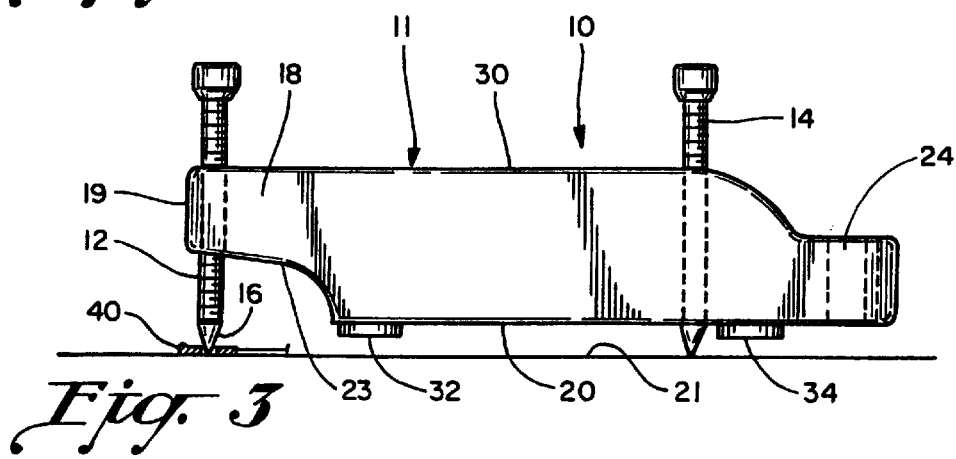
FIG. 3 is a side view of the measuring system illustrated in FIGS. 1 and 2.
Figure 4:
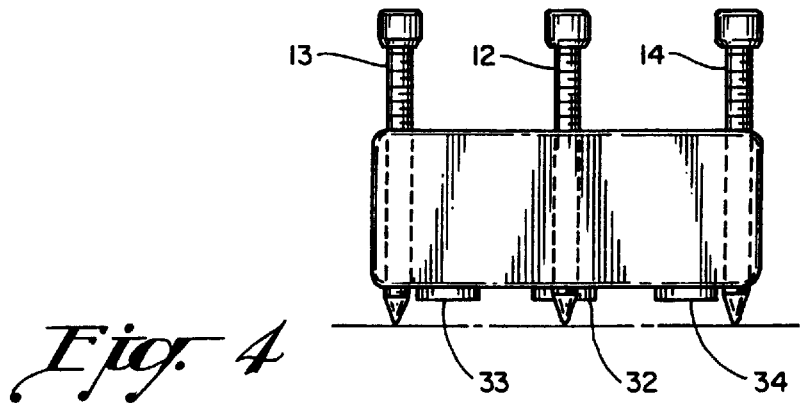
FIG. 4 is a front view of the measuring system illustrated in FIGS. 1 to 4.
Figure 5:
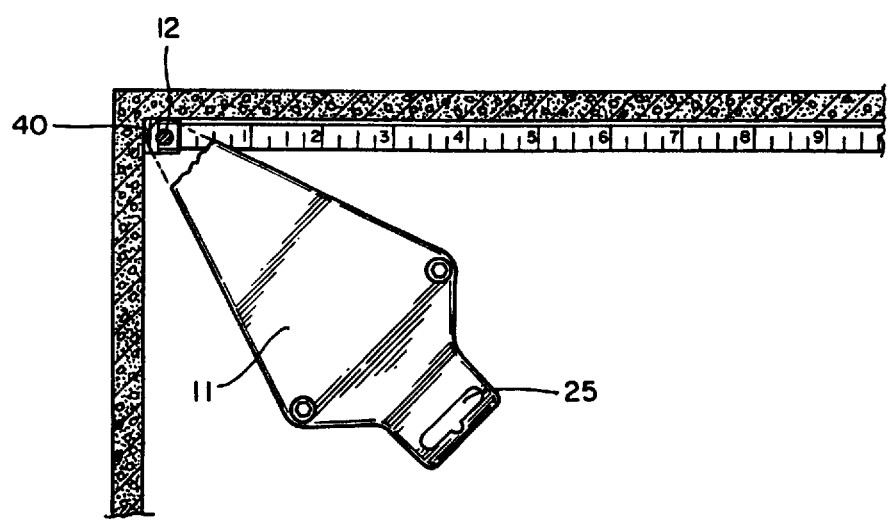
FIG. 5 is a top view of the measuring system holding a measuring tape loop at the juncture of two vertical walls.
Figure 6:
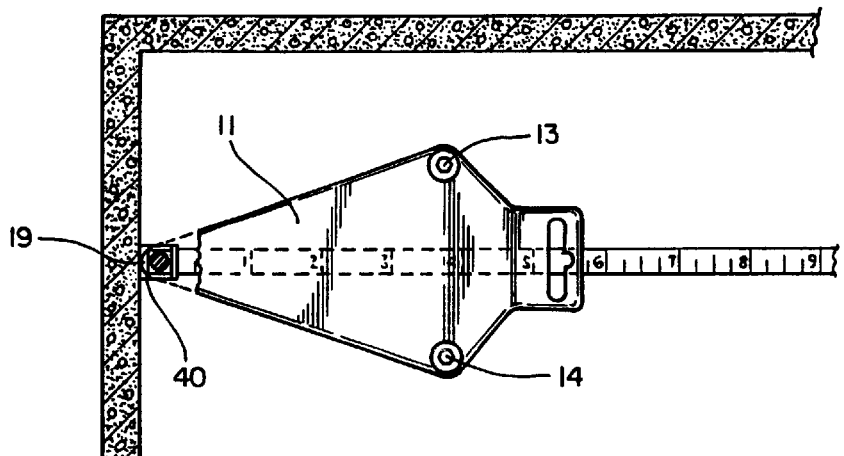
FIG. 6 is a top view similar to FIG. 5 showing the measuring system holding a tape loop against a vertical wall.
Figure 7:
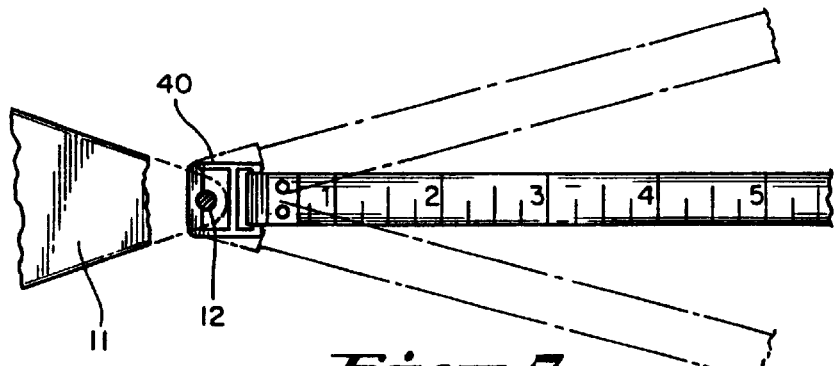
FIG. 7 is a fragmentary view of the pointed end of the system holding a tape loop in an arc swinging manner.
Figure 8:
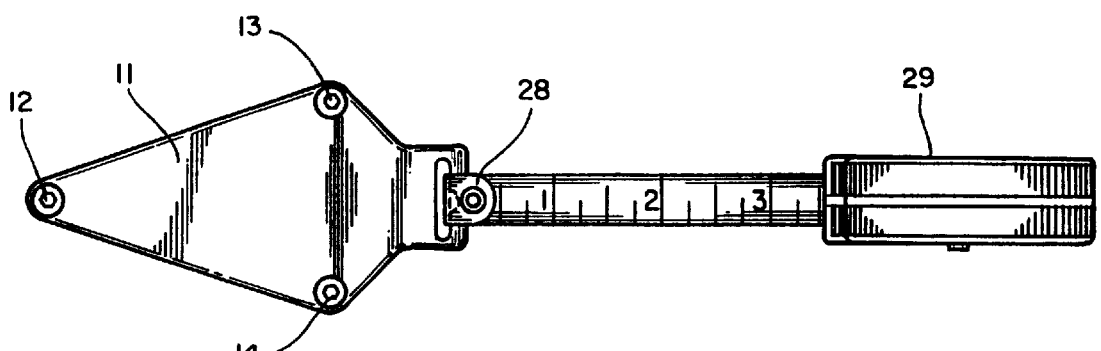
FIG. 8 is a top view of the measuring system holding fast a hook on the end of a coil measuring tape.

The body 11, as seen in FIG. 2, has a narrow pointed forward end 18 with an included angle X of about 40 degrees to enable the forward screw 12 to position a tape loop as seen in FIGS. 3, 5 and 6 against vertical walls. The end surface 19 of the forward end 18 of the body lies in the same vertical plane as seen in FIG. 3 as the outer edge of tape loop 40. In this way, when the user engages the body 11 against a vertical wall, the outer edge of tape loop 40 also engages that wall for accurate measurements.

As seen in FIG. 3, body 11 has a generally planar, horizontal lower surface 20 that is adjustably spaced above supporting surface 21 by the user rotatable screws 12, 13 and 14. This spacing permits the tape to extend underneath the body 11 in a wide variety of angular positions such as illustrated in FIG. 6 and enables the tape to be swung in arcs. The forward end 18 of the body 11 has a lower arcuate surface 23 that extends upwardly and forwardly from lower surface 20 to provide lower clearance at the forward end of the body 11. An integral projection 24 extends rearwardly from the body 11 and has an elongated vertical slot 25 extending completely there-through that is adapted to receive the hook 28 at the zero end of a coil measuring tape such as shown in FIG. 9. Of course, in this mode of operation, it is not possible to position the hook 28 against the wall so that some compensation may be required in this mode.

When the system 10 is utilized with the screws 12, 13 and 14 extended as seen in FIG. 3, for example, when measuring concrete or other very durable surfaces, the hardened pointed ends of the screws can be set slightly in the horizontal supporting surface 21 by tapping upper surface 30 of the body member with one's hand.

In situations where this is undesirable because of possible damage to the supporting surface, the user simply unthreads the screws 12, 13 and 14 so that the points 16 do not project beyond the plane of the lower surface 20, and this permits one of three elastomeric pads 32, 33 and 34 to engage surface 21 and support and hold the body 11 in position. In this mode, the forward screw is unthreaded to a position wherein the tip of its end 16 is just above the plane of the lower surface of pads 32, 33 and 34.

As seen in FIG. 9, the system 10 can be utilized to hold a loop 35 associated with a snap line 36 in position and by utilizing two systems 10, both ends of the snap line can be held fast and in this way a single person can snap the line without any helpers at all.

I claim:

1. A measuring tape zero end holding system for a zero loop tape, comprising: a weighted body member, means on the body member for holding the body member fast against a generally horizontal surface without a removable fastener, said body member having a forward end narrower than a rear portion thereof, and means on the body member and projecting from the body member for holding the zero end loop of a measuring tape against a generally vertical surface so that measurements from the generally vertical surface may be read directly from the tape without compensation and for permitting the tape to swing freely laterally under the body member including a projection extending donwardly from the forward end of the body member having an end portion for supporting the tape loop directly on the horizontal surface.

2. A measuring tape zero end holding system as defined in claim 1, wherein the means for holding the body member fast to a generally horizontal surface includes said body member being heavily weighted and at least three leg members projecting downwardly from the body member, one of said leg members defining said projection extending downwardly from the forward end of the body member, said leg members spacing the body member from the horizontal surface so the measuring tape can pass under the entire body member when holding the zero end loop against the generally vertical surface.

3. A measuring tape zero end holding system as defined in claim 1, including a slot in the body member for holding fast the end of a coiled measuring tape hook end.

4. A measuring tape zero end holding system for a zero loop tape, comprising: a weighted body member, means on the body member for holding the body member fast against a generally horizontal surface with said body member having a narrow forward end, and means on the body member and protecting from the body member for holding the zero end loop of a measuring tape against a generally vertical surface so that measurements from the generally vertical surface may be read directly from the tape without compensation including a projection extending downwardly from the narrow end of the body member having an end portion for supporting the tape loop directly on the horizontal surface, said means for holding the body member fast to a generally horizontal surface includes said body member being heavily weighted and at least three leg members projecting downwardly from the body member, one of said leg members defining said projection extending downwardly from the narrow end of the body member, said leg members configured to space the body member from the horizontal surface so the measuring tape can pass under the body member when holding the zero end loop against the generally vertical surface, said leg members have pointed ends to engage and grip certain types of surfaces, said body member having a lower surface with an elastomeric means adapted to engage and grip the generally horizontal surface with the leg members retracted.

5. A measuring tape zero end holding system, comprising: a body member, means on the body member for holding the body member fast against a generally horizontal surface, and means on the body member and projecting from the body member for holding the zero end of a measuring tape against a generally vertical surface so that measurements from the generally vertical surface may be read directly from the tape without compensation, said means for holding the body member fast to a generally horizontal surface including at least three leg members projecting downwardly from the body member, said body member having a generally triangular configuration in a horizontal plane, with a pointed end of the body member having an included angle of approximately 40 degrees in the same horizontal plane, one of said leg members being located at the pointed end and defining the means to hold the tape zero end against the generally vertical surface, said body member having a surface engageable with the vertical wall wherein the one leg member holds the tape zero end against the vertical wall surface.

6. A measuring tape zero end holding system, comprising: a weighted body member having a narrow projecting end portion, leg members for supporting the body member above a horizontal supporting surface, and means located at the narrow projecting end portion of the body member and extending downwardly therefrom for holding a measuring tape zero end loop directly on a horizontal surface and against a generally vertical wall so measurements may be read directly from the tape without compensation, said body member having a surface engageable with the vertical wall when the means for holding a measuring tape holds the tape zero end loop against the vertical wall, said leg members spacing the body member sufficiently from the horizontal supporting surface so the tape can pass and freely swing laterally under substantially the entire body member when the zero end loop is held against the generally vertical wall.

7. A measuring tape zero end holding system as defined in claim 6, including a slot in the body member for holding fast the end of a coiled measuring tape hook end.

8. A measuring tape zero end holding system, comprising: a weighted body member having a narrow protecting end portion, leg members for supporting the body member above a horizontal supporting surface, and means located at the narrow projecting end portion of the body member for holding a measuring tape zero end loop against a generally vertical wall so measurements may be read directly from the tape without compensation, said body member having a surface engageable with the vertical wall when the means for holding a measuring tape holds the tape zero end loop against the vertical wall, said leg members spacing the body member sufficiently from the horizontal supporting surface so the tape can pass under the body member when the zero end loop is held against the generally vertical wall, said leg members being pointed, one of the leg members being positioned at the narrow projecting end portion of the body member and defining the means for holding a measuring tape zero end loop.

9. A measuring tape zero end holding system, comprising: a weighted body member having a narrow projecting end portion, at least three leg members for supporting the body member above a generally horizontal supporting surface, means located at the narrow projecting end portion of the body member for holding a measuring tape zero end loop, said means being one of said leg members, said leg members having pointed ends to engage and grip certain types of surfaces, said body member having a lower surface with an elastomeric means adapted to engage and grip the generally horizontal supporting surface with the leg members retracted, said body member having a generally triangular configuration in a horizontal plane, with a pointed end of the body member having an included angle of approximately 40 degrees in the same horizontal plane, and a slot in the body member for holding fast the end of a coiled measuring tape hook end.

10. A measuring tape zero end holding system, comprising: a weighted body member having a narrow protecting end portion, leg members for supporting the body member above a horizontal supporting surface, and means located at the narrow Protecting end portion of the body member for holding a measuring tape zero end loop against a generally vertical wall so measurements may be read directly from the tape without compensation, said body member having a surface engageable with the vertical wall when the means for holding a measuring tape holds the tape zero end loop against the vertical wall, said leg members spacing the body member sufficiently from the horizontal supporting surface so the tape can pass under the body member when the zero end loop is held against the generally vertical wall, said leg members having pointed ends to engage and grip certain types of surfaces, said body member having a lower surface with an elastomeric means adapted to engage and grip the generally horizontal supporting surface with the leg members retracted.

11. A measuring tape zero end holding system, comprising: a weighted body member having a narrow projecting end portion, leg members for supporting the body member above a horizontal supporting surface, and means located at the narrow projecting end portion of the body member for holding a measuring tape zero end loop against a generally vertical wall so measurements may be read directly from the tape without compensation, said body member having a surface engageable with the vertical wall when the means for holding a measuring tape holds the tape zero end loop against the vertical wall, said body member having a generally triangular configuration in a horizontal plane, with a pointed end of the body member having an included angle of approximately 40 degrees in the same horizontal plane.

\* \* \* \* \*